(12) United States Patent
Musgrave et al.

(10) Patent No.: US 7,122,601 B2
(45) Date of Patent: Oct. 17, 2006

(54) PROPERTIES OF POLYOLEFIN BLENDS AND THEIR MANUFACTURED ARTICLES

(75) Inventors: Michael Musgrave, Houston, TX (US); Likuo Sun, Houston, TX (US); Mark Miller, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/628,222

(22) Filed: Jul. 28, 2003

(65) Prior Publication Data

US 2005/0027077 A1 Feb. 3, 2005

(51) Int. Cl.
- C08L 23/00 (2006.01)
- C08L 23/10 (2006.01)
- C08L 23/12 (2006.01)
- C08L 23/16 (2006.01)
- C08L 9/00 (2006.01)

(52) U.S. Cl. ............... 525/191; 525/232; 525/240

(58) Field of Classification Search ............ 525/191, 525/232, 240
See application file for complete search history.

(56) References Cited

U.S. PATENT DOCUMENTS

| | | |
|---|---|---|
| 3,888,949 A | 6/1975 | Shih |
| 3,900,534 A | 8/1975 | Schard |
| 4,036,912 A | 7/1977 | Stricharczuk |
| 4,059,654 A | 11/1977 | Von Bodungen |
| 4,088,714 A | 5/1978 | Huff |
| 4,113,806 A | 9/1978 | Watson |
| 4,221,882 A | 9/1980 | Huff ............... 525/240 |
| 4,251,646 A | 2/1981 | Smith ............. 525/88 |
| 4,296,022 A | 10/1981 | Hudson |
| 4,311,628 A | 1/1982 | Abdou-Sabet |
| 4,316,970 A | 2/1982 | Hughes ........... 525/240 |
| 4,632,881 A | 12/1986 | Trotz et al. ...... 428/541 |
| 4,634,739 A | 1/1987 | Vassilatos ....... 525/240 |
| 4,774,277 A | 9/1988 | Janac et al. ...... 524/474 |
| 4,804,714 A | 2/1989 | Olivo ............. 525/240 |
| 4,892,911 A | 1/1990 | Genske ........... 525/240 |
| 4,929,681 A | 5/1990 | Bahl et al. ...... 525/240 |
| 5,006,384 A | 4/1991 | Genske ........... 428/36.7 |
| 5,071,686 A | 12/1991 | Genske et al. ... 428/35.7 |
| 5,073,599 A | 12/1991 | Genske ........... 525/240 |
| 5,110,642 A | 5/1992 | Genske ........... 428/35.8 |
| 5,147,936 A | 9/1992 | Peszkin et al. .. 525/240 |
| 5,218,047 A | 6/1993 | Schwager et al. 525/88 |
| 5,319,029 A | 6/1994 | Martin et al. ... 525/240 |
| 5,359,001 A | 10/1994 | Epple et al. .... 525/97 |
| 5,369,181 A | 11/1994 | Hwo .............. 525/240 |
| 5,389,448 A | 2/1995 | Schirmer et al. 428/517 |
| 5,455,305 A * | 10/1995 | Galambos ....... 525/240 |
| 5,681,897 A * | 10/1997 | Silvis et al. ..... 525/150 |
| 5,792,549 A * | 8/1998 | Wilkie ........... 428/215 |
| 5,910,539 A * | 6/1999 | Matsunaga et al. 525/88 |
| 6,436,494 B1 * | 8/2002 | Tanaka et al. ... 428/34.3 |
| 6,787,243 B1 * | 9/2004 | Su et al. ......... 428/461 |
| 6,803,415 B1 * | 10/2004 | Mikielski et al. 525/191 |

* cited by examiner

*Primary Examiner*—Nathan M. Nutter
(74) *Attorney, Agent, or Firm*—Tenley R. Kruegar

(57) ABSTRACT

A polymer blend and a method of making the same are provided. The polymer blend includes an ethylene-propylene ($C_2$–$C_3$) random copolymer and a modifier selected from the group consisting of a metallocene-catalyzed polyethylene-based copolymer, a metallocene-catalyzed polyethylene-based terpolymer, and a syndiotactic polypropylene homopolymer. The polymer blend may also include an organic peroxide for visbreaking the polymer blend. An end use article is made from the foregoing polymer blend. The end use article may be, for example, a film, an injection molded article, a compression molded article, a thermoformed article, and a fiber. The end use article is desirably a film having an Elmendorf tear strength of at least about 300 g/ply in the machine and transverse directions.

12 Claims, No Drawings

PROPERTIES OF POLYOLEFIN BLENDS AND THEIR MANUFACTURED ARTICLES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to polyolefin blends that can be used to manufacture articles having improved mechanical toughness, an increased level of impact-resistance, or good optical clarity. More particularly, the present invention relates to an ethylene-propylene ($C_2$–$C_3$) random copolymer blended with metallocene-catalyzed, polyethylene-based copolymers; metallocene-catalyzed, polyethylene-based terpolymers; or syndiotactic polypropylene polymers. The polyolefin blends of the present invention may be formed into films, sheets, molded articles or the like.

BACKGROUND OF THE INVENTION

Film-grade homopolymers have traditionally been used in the manufacture of films, sheets, and similar articles. Recently, a resin blend using a base material of $C_2$–$C_3$ random copolymer and an additive of a Zeigler-Natta catalyzed ethylene/alpha-olefin copolymer has been shown to exhibit improved film properties (such as impact strength, tear strength, tensile strength, and tensile modulus) compared to film-grade homopolymers. Since the ethylene/alpha-olefin copolymer, for example TAFMER available from Mitsui Petrochemical of Tokyo, Japan, is relatively expensive compared to conventional film-grade homopolymers, it would be desirable to discover alternative additives that cost less than the ethylene/alpha-olefin copolymer but provide equivalent film properties. Similarly, the discovery of additives that provide further improvements in film strength with little or no increase in cost would also be desirable. For some applications, it may also be desirable that a film exhibit a lower tensile modulus and thus feel softer. In other cases, improving the clarity of a film might be important. The present application addresses such needs.

SUMMARY OF THE INVENTION

According to an embodiment, a polymer blend includes an ethylene-propylene ($C_2$–$C_3$) random copolymer and a modifier selected from the group consisting of a metallocene-catalyzed polyethylene-based copolymer, a metallocene-catalyzed polyethylene-based terpolymer, and a syndiotactic polypropylene homopolymer. The polymer blend may also include an organic peroxide for visbreaking the polymer blend. The $C_2$–$C_3$ random copolymer desirably comprises about 2 weight percent ethylene. The amount of modifier in the blend is desirably about 7 weight percent based on the total weight of the blend.

In another embodiment, an end use article is made from the foregoing polymer blend. The end use article may be, for example, a film, an injection molded article, a compression molded article, a thermoformed article, and a fiber. The end use article is desirably a film. If the modifier in the polymer blend is a metallocene-catalyzed polyethylene-based copolymer, the film desirably has the following properties: a tensile strength value of at least about 7.4 lb/in in the machine direction and at least about 7.2 lb/in in the transverse direction; an Elmendorf tear strength value of at least about 520 g/ply in the transverse direction and at least about 520 g/ply in the machine direction; and a drop dart value of at least about 300 g. On the other hand, if the modifier is a metallocene-catalyzed polyethylene-based terpolymer, the film desirably has the following properties: a tensile strength value of at least about 7.4 lb/in in the machine direction and at least about 7.2 lb/in in the transverse direction; an Elmendorf tear strength value of at least about 880 g/ply in the transverse direction and at least about 490 g/ply in the machine direction; and a drop dart value of at least about 300 g. However, if the modifier is a syndiotactic polypropylene homopolymer, the film desirably has the following properties: a haze value of less than or equal to about 0.7%; a tensile strength of at least about 7.5 lb/in in the machine direction and at least about 7.1 lb/in in the transverse direction; and an Elmendorf tear strength (ASTM D1922) value of at least about 410 g/ply in the machine direction and at least about 450 g/ply in the transverse direction.

In yet another embodiment, a method of making a polymer blend comprises providing an ethylene-propylene random copolymer and blending the copolymer with a modifier to form a polymer blend. The modifier may be a metallocene-catalyzed polyethylene-based copolymer, a metallocene-catalyzed polyethylene-based terpolymer, or a syndiotactic polypropylene homopolymer. The polymer blend may be formed into an end use article such as a film.

BRIEF DESCRIPTION OF THE DRAWINGS

Not applicable.

DETAILED DESCRIPTION OF THE INVENTION

An ethylene-propylene ($C_2$–$C_3$) random copolymer base material is blended with various modifiers. In an embodiment, the modifier is a metallocene-catalyzed, polyethylene-based copolymers. In another embodiment, the modifier is a metallocene-catalyzed, polyethylene-based terpolymers. In another embodiment, the modifier is a syndiotactic polypropylene homopolymer.

Ethylene-propylene ($C_2$–$C_3$) random copolymers are formed by the catalyzed polymerization of a mixture of propylene and ethylene monomers. Desirably, the $C_2$–$C_3$ random copolymers used herein are propylene based, meaning that the $C_2$–$C_3$ random copolymer desirably has a greater weight percentage of propylene than ethylene, and more desirably has a substantially greater weight percentage of propylene than ethylene. In an embodiment, the $C_2$–$C_3$ random copolymer has about 2 weight percent ethylene (i.e., 2% $C_2$, $C_2$–$C_3$ random copolymer). In another embodiment, the $C_2$–$C_3$ random copolymer has from about 0.4 to about 4 weight percent ethylene (i.e., 0.4 to 4% $C_2$, $C_2$–$C_3$ random copolymer) The $C_2$–$C_3$ random copolymer is desirably catalyzed using a Zeigler-Natta catalyst as is known in the art. The 2% $C_2$, $C_2$–$C_3$ random copolymer base material has a density of about 0.89 g/cc; a weight average molecular weight of from about 200,000 to about 450,000; a melt flow rate of from about 1.5 to about 50 dg/min with a 2.16 Kg load at 230° C.; and a weight average molecular weight distribution in the range of from about 3 to about 8. An example of a commercially available 2% $C_2$, $C_2$–$C_3$ random copolymer is 6234, which is sold by Atofina Petrochemicals of LaPorte, Tex.

Metallocene-catalyzed, polyethylene-based copolymers are polymers formed by the metallocene catalyzed polymerization of primarily ethylene with lesser amounts of a second monomer, typically an alpha-olefin such as butene, desirably hexane or octene. In an embodiment, the second monomer is present in the polymer in an amount of from about 10 to about 30 weight percent, desirably from about 15 to about 25 weight percent, and more desirably about 25 weight percent. The metallocene-catalyzed, polyethylene-based copolymer modifiers have a density of from about 0.86 to about 0.91 g/cc; a MI2 melt flow index of from about 0.5 to about 5 dg/min with a 2.16 Kg load at 190° C. Examples of commercially available metallocene-catalyzed, polyethylene-based copolymers belong to the EXACT® plastomers and the Engage® polyolefin elastomers, which are available from Exxon Mobile Corporation and DuPont Dow Elastomers L.L.C., respectively.

Metallocene-catalyzed, polyethylene-based terpolymers are polymers formed by the metallocene catalyzed polymerization of primarily ethylene with lesser amounts of second and third monomers, typically alpha-olefins such as butene, desirably hexene. The metallocene-catalyzed, polyethylene-based terpolymer modifiers have a density of from about 0.87 to about 0.91 g/cc and a MI2 melt flow rate of from about 1 to about 5 dg/min with a 2.16 Kg load at 190° C. Examples of commercially available metallocene-catalyzed, polyethylene-based terpolymers also belong to the EXACT® plastomers and the Engage® polyolefin elastomers.

Syndiotactic polypropylene (sPP) homopolymers are formed by the catalyzed polymerization of a mixture of propylene monomer. Desirably, the syndiotactic polypropylene homopolymers have a degree of syndiotacticity of from about 75 to about 80 mole % rrr by NMR methods. The syndiotactic polypropylene homopolymer is desirably catalyzed using a Zeigler-Natta catalyst as is known in the art. The syndiotactic polypropylene homopolymer modifiers have a density of from about 0.87 to about 0.89 g/cc; a melt flow rate of from about 2 to about 20 dg/min with a 2.16 Kg load at 230° C.; and a weight average molecular weight distribution in the range from about 2.2 to about 3.5. Examples of commercially available syndiotactic polypropylene homopolymers are polymers known as Fina EOD 93-06 and Fina EOD 93-07 and polymers sold under the trademark FINAPLAS, all of which are available from Atofina Petrochemicals of LaPorte, Tex. By way of example, FINAPLAS 1471 has a melt flow rate of about 4 g/10 min; FINAPLAS 1571 has a melt flow rate of about 12 g/10 min; FINAPLAS 1751 has a melt flow rate of about 20 g/10 min; and FINAPLAS 1251 has a melt flow rate of about 2 g/10 min. As used herein, sPP homopolymers include random copolymers of sPP having a very small amount of ethylene, i.e., less than about 1 wt % of the total polymer composition. Syndiotactic polypropylene copolymers having less than about 1 wt % of ethylene behave very much like 100 wt % sPP homopolymers in regard to most physical properties. However, the melt temperature of these materials is slightly less than that required by FDA regulations (see 21 CFR 177.1520) for a pure sPP homopolymer. Unless noted to the contrary, the term sPP homopolymer will be understood to include both pure sPP homopolymers and sPP copolymers containing less than about 1 wt % of various alpha olefins.

The random copolymer base material is blended with one of the modifiers (i.e, a metallocene-catalyzed, polyethylene-based copolymer; a metallocene-catalyzed, polyethylene-based terpolymer; or a syndiotactic polypropylene homopolymer) desirably in the range of from about 2 to about 20 wt. % based on the total weight of the blend, more desirably from about 4 to about 10 wt. %, and most desirably about 7 wt. %. A sufficient amount of an organic peroxide may be added to the blend for visbreaking it. The concentration of the organic peroxide may, for example, range from about 300 ppm to about 1,000 ppm. Examples of peroxides include 2,5-dimethyl-2,5 di-(tert-butylperoxy) hexane and 3,6,9-triethyl-3,6,9-trimethyl-1,2,4,5,7,8-hexonone. Optionally, a resin stabilizer package containing sufficient amounts of a catalyst neutralizer (acid scavenger) and primary and secondary antioxidants may be added to the blend to prevent polymer degradation.

The $C_2$–$C_3$ random copolymer base material is blended with a metallocene-catalyzed, polyethylene-based copolymer desirably in the range of from about 3 to about 20 wt. % based on the total weight of the blend, more desirably from about 4 to about 10 wt. %, and most desirably about 7 wt. %. The blends of the $C_2$–$C_3$ random copolymer and the metallocene-catalyzed, polyethylene-based copolymers have a density of from about 0.87 to about 0.91 g/cc; a melt flow rate of from about 8 to about 12 dg/min with a 2.16 Kg load at 230° C.; and a weight average molecular weight distribution in the range of from about 4 to about 7.

The $C_2$–$C_3$ random copolymer base material is blended with a metallocene-catalyzed, polyethylene-based terpolymer desirably in the range of from about 3 to about 20 wt. % based on the total weight of the blend, more desirably from about 4 to about 10 wt. %, and most desirably about 7 wt. %. The blends of the $C_2$–$C_3$ random copolymer and the metallocene-catalyzed, polyethylene-based terpolymers have a density of from about 0.87 to about 0.91 g/cc; a melt flow rate of from about 8 to about 12 dg/min with a 2.16 Kg load at 230° C.; and a weight average molecular weight distribution in the range of from about 4 to about 7.

The $C_2$–$C_3$ random copolymer base material is blended with a syndiotactic polypropylene homopolymer desirably in the range of from about 3 to about 20 wt. % based on the total weight of the blend, more desirably from about 4 to about 10 wt. %, and most desirably about 7 wt. %. The blends of the $C_2$–$C_3$ random copolymer and the syndiotactic polypropylene homopolymer have a density of about 0.89 g/cc; a melt flow rate of from about 8 to about 12 dg/min with a 2.16 Kg load at 230° C.; and a weight average molecular weight distribution in the range from about 4 to about 7.

The random copolymer is typically provided in the form of pellets or fluff, which may be dry blended (e.g., tumble blended) with pellets or fluff of one of the modifiers. Apparatus suitable for blending the base material and a modifier include a Henschel blender or a Banbury mixer, or alternatively low shear blending equipment of the type that typically accompanies a commercial blow molding or sheet extrusion line. The blends are typically mechanically compounded or sheared into a molten polymer blend for subsequent forming into end use articles. Polyolefin blends produced in accordance with the present invention may be used as a single layer or as a component in a multiple layer structure which will result in the production of films that exhibit improved mechanical toughness, tear strength, and optical clarity. In addition, these blends may be used to manufacture other articles with improved mechanical toughness and optical clarity via injection molding, thermoforming and other basic plastic fabrication techniques as known to those skilled in the art. Such articles could include clear, high cold-impact, injection-molded products; ultraclear, room-temperature, high-toughness products; and clear, low-extractables, high cold-impact medical bags. The blends may also have reduced tensile modulus, which produces a polymer film having improved softness.

The blends comprising a $C_2$–$C_3$ random copolymer and a modifier may be used in the manufacture of end use articles via extrusion, injection molding, compression molding, thermoforming, and other plastic fabrication techniques known by a person of ordinary skill in the art. Desirable end use articles include cast films of from about 3.5 to about 4.0 mil thickness. Such cast films may be produced by melting the polymer blends and subsequently passing the molten polymer blends through an extruder and over machine rollers. In an embodiment, the molten polymer exits the extruder at 490° F., the cast rollers are at a temperature of 70° F., and the line speed is 100 fpm. The films desirably have an Elmendorf tear strength greater than 300 g/ply with minimal loss in film tensile strength. The blends may also be formed into fibers by subjecting them to any suitable melt spinning procedure, such as the Fourne fiber spinning procedure, known by a person of ordinary skill in the art.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Twelve polymer blends were produced, and the properties of films made from the blends were tested. Nine of the blends (examples 3–11) were carried out in accordance with the present invention, and three blends (examples 1, 2, and 12) were prepared as controls. Each of the blends, except for comparative example 12, were made using a 2% $C_2$, $C_2$–$C_3$ random copolymer fluff known as 6200 or 6400. The blends of Examples 2–11 further included 7 weight percent of a modifier (i.e, a metallocene-catalyzed, polyethylene-based copolymer; a metallocene-catalyzed, polyethylene-based terpolymer; or a syndiotactic polypropylene homopolymer) based on the total weight of the blend. All of the blends included an additive package having a resin stabilizer package containing sufficient amounts of a catalyst neutralizer (acid scavenger) and primary and secondary antioxidants to prevent polymer degradation via heat and shear during the film converting process and use by the consumer. Examples 1–10 were visbroken by peroxide to a targeted melt flow rate of 9 grams per 10 minutes. Various amounts of peroxide were used to perform the visbreaking.

The blends in each example were thoroughly blended using a mixer. The blends were melted and pelletized using a single screw extruder. Four mil films were extruded from the various formulations at a melt temperature of 490° F., a cast roll temperature of 70° F., and a line speed of 100 fpm. The resulting films were tested to determine tensile strength using ASTM D638, Elmendorf tear strength using ASTM D1922, dart drop using ASTM D1709, haze using ASTM D1003, and 45° gloss using ASTM D2457. To determine the Elmendorf tear strength, the force in grams required to propagate tearing across each film was measured using a precisely calibrated pendulum device. Driven by gravity, the pendulum swung through an arc, tearing the film from a precut slit. The film was held on one side by the pendulum and on the other side by a stationary member. The loss in energy by the pendulum was indicated by a pointer having a scale that is a function of the force required to tear the film. The dart drop test was used to determine the energy that caused the film to fail under specified condition of impact from a free-falling dart.

Example 1

As a control, the 6200 $C_2$–$C_3$ base material was used without any modifier and with the additive package. Visbreaking was done with 0.030% peroxide to attain a melt flow rate of 9.2.

Example 2

In another control, the 6200 $C_2$–$C_3$ base material was blended with an ethylene/alpha-olefin copolymer known as TAFMER P-0680, available from Mitsui Petrochemical of Tokyo, Japan. TAFMER P-0680 is made with Ziegler-Natta catalyst, has a density of 0.87 g/cc, and is classified as an ultra low-density polyethylene (ULDPE). The blend included the additive package and was visbroken with 0.038% peroxide to attain a melt flow rate of 8.3.

Example 3

The 6200 $C_2$–$C_3$ base material was blended with a modifier known as ENGAGE EG8150 available from Dupont Dow Elastomers of Wilmington, Del. ENGAGE EG8150 is a metallocene-catalyzed, polyethylene-based copolymer with a melt index of 0.5, a density of 0.868, and a copolymer of $C_8$, 25%. The blend included the additive package and was visbroken with 0.040% peroxide and a melt flow rate of 8.9 was attained. As indicated in Table 1 below, example 3 exhibited improved tear strength compared to example 1, the compound containing TAFMER P-0680, without significant loss of tensile strength. Example 3 had a tensile strength of at least 7.3 and a tear strength of at least 520.

Example 4

The 6200 $C_2$–$C_3$ base material was blended with a modifier known as ENGAGE EG8100 available from Dupont Dow Elastomers of Wilmington, Del. ENGAGE EG8100 is a metallocene-catalyzed, polyethylene-based copolymer with a melt index of 1.0, a density of 0.87, and a copolymer of $C_8$, 24%. The blend included the additive package and was visbroken with 0.038% peroxide and a melt flow rate of 8.2 was attained. As shown in Table 1, example 4, with a dart drop value of 301, had a significant improvement in drop impact strength compared to example 1.

Example 5

The 6200 $C_2$–$C_3$ base material was blended with a modifier known as EXACT 3033 available from Exxon Chemical Company of Houston, Tex. EXACT 3033 is a metallocene-catalyzed, polyethylene-based terpolymer with a melt index of 1.2, a density of 0.90, and a copolymer of $C_4$/$C_6$. The blend included the additive package and was visbroken with 0.039% peroxide and a melt flow rate of 7.9 was attained. As indicated in Table 1, example 5 exhibited improved tear strength compared to example 1, the compound containing TAFMER P-0680, without significant loss of tensile strength. Example 5 had a tensile strength of at least 7.6 and a tear strength of at least 490. Example 5, with a dart drop value of 309, also had a significant improvement in drop impact strength compared to example 1.

Example 6

The 6200 $C_2$–$C_3$ base material was blended with a modifier known as EXACT 3034 available from Exxon Chemical Company of Houston, Tex. EXACT 3034 is a metallocene-catalyzed, polyethylene-based terpolymer with a melt index of 3.5, a density of 0.90, and a copolymer of $C_4$/$C_6$. The blend included the additive package and was visbroken with 0.037% peroxide, and a melt flow rate of 8.8 was attained.

Example 7

The 6200 $C_2$–$C_3$ base material was blended with a modifier known as EXACT 4011 available from Exxon Chemical Company of Houston, Tex. EXACT 4011 is a metallocene-catalyzed, polyethylene-based copolymer with a melt index of 2.2, a density of 0.885, and a copolymer of $C_4$. The blend included the additive package and was visbroken with 0.038% peroxide and a melt flow rate of 9.5 was attained.

Example 8

The 6200 $C_2$–$C_3$ base material was blended with a modifier known as EXACT 4041 available from Exxon Chemical Company of Houston, Tex. EXACT 4041 is a metallocene-catalyzed, polyethylene-based copolymer with a melt index of 3.0, a density of 0.878, and a copolymer of $C_4$. The blend included the additive package and was visbroken with 0.038% peroxide and a melt flow rate of 8.4 was attained. As indicated in Table 1, example 8, with a dart drop value of 344, had a significant improvement in drop impact strength compared to example 1. Example 8 also exhibited the best balance of improvements in several film properties without significant degradation of other properties. Specifically, example 8 had a tensile strength of at least 7.4, a tear strength of at least 340, a dart drop value of 344, and a haze value of 7.0%. The tensile strength, dart drop, and haze values compare favorably with example 2, the control sample, while the tear strength in the machine direction for example 8 was only slightly less than that for example 2.

Example 9

The 6200 $C_2$–$C_3$ base material was blended with a modifier known as Fina EOD 93-06 available from Atofina Petrochemicals of LaPorte, Tex. Fina EOD 93-06 is a syndiotactic polypropylene homopolymer having the following properties: a melt flow rate of about 4 g/10 min (ASTM D1238); a melt point temperature of about 130° C. (DSC); a tensile strength of about 15 MPa (ASTM D638); a tensile modulus of about 480 MPa (ASTM D638); an elongation at yield of about 10% (ASTM D790); an elongation at break of about 300% (ASTM D790); a flexural modulus of about 300 MPa (ASTM D638); and a of about 300% (ASTM D790); a flexural modulus of about 300 MPa (ASTM D638); and a haze of about 4.8%. The blend included the additive package and was visbroken with 0.035% peroxide and a melt flow rate of 10.1 was attained. Table 1 shows that example 9 had outstanding optical properties as indicated by the very low haze value of 0.7%.

This improvement in clarity was achieved while maintaining tensile and tear strengths comparable to example 2.

Example 10

The 6200 $C_2$–$C_3$ base material was blended with a modifier known as Fina EOD 93-07 available from Atofina Petrochemicals of LaPorte, Tex. Fina EOD 93-07 is a syndiotactic polypropylene homopolymer having the following properties: a melt flow rate of about 10 g/10 min (ASTM D1238); a melt point temperature of about 130° C. (DSC); a tensile strength of about 16 MPa (ASTM D638); a tensile modulus of about 490 MPa (ASTM D638); an elongation at yield of about 10% (ASTM D790); an elongation at break of about 310% (ASTM D790); a flexural modulus of about 300 MPa (ASTM D638); and a haze of about 4.6%. The blend included the additive package and was visbroken with 0.032% peroxide and a melt flow rate of 9.6 was attained. Table 1 shows that example 10 had outstanding optical properties as indicated by the very low haze value of 0.5%.

Example 11

The 6200 $C_2$–$C_3$ base material was blended with a modifier known as ENGAGE EG8150 available from Dupont Dow Elastomers of Wilmington, Del. The blend included the additive package, but was not visbroken. The compound had a melt flow rate of 4.3.

Example 12

In another control, a film-grade polypropylene homopolymer known as Fina 3576uX available from Atofina Petrochemicals of LaPorte, Tex. was used. No modifier was used, and no visbreaking was done. The compound had a melt flow rate of about 9.

Results of the tests performed on Examples 1–12 are presented in Tables 1a and 1b. In the tables, the melt flow rate (MFR) is given in units of grams per 10 minutes, tensile strength is in pound force per square inch, Elmendorf tear strength is in grams per ply, dart drop is in grams, haze is in percent, and 45° gloss is in percent.

Films made from blends containing the metallocene-catalyzed, polyethylene-based copolymer and terpolymer modifiers exhibited improved tear strength and drop impact strength compared to films made from the samples in examples 1 and 6.

Films made from blends containing the syndiotactic polypropylene homopolymer modifiers exhibited improved clarity compared to films made from the samples in example 1 and 6.

Films made from a blend containing a metallocene-catalyzed, polyethylene-based terpolymer modifier exhibited the best balance of improvements in several film properties without significant degradation of other properties.

In summary, using the modifiers provided for higher Elemdorf tear strengths while minimizing the loss of machine direction tensile strength (measured at yield). In addition, the M D Young's Modulus demonstrated improved softness important for film applications where a more compliant film was desired. Thus, the present disclosure provides for the formation of a softer, tougher, and stronger film compared to films made from the samples in example 1 (Fina N94105-1) and example 6 (Fina 3576 PP homo).

TABLE 1a

| Example Number | 1 | 2 | 3 | 4 | 5 | 6 |
|---|---|---|---|---|---|---|
| Base Material | 6200 | 6200 | 6200 | 6200 | 6200 | 6200 |
| Modifier | none | TAFMER P-0680 | ENGAGE EG8150 | ENGAGE EG8100 | EXACT 3033 | EXACT 3034 |
| Wt. % Peroxide | 0.030 | 0.038 | 0.040 | 0.038 | 0.039 | 0.037 |
| MFR | 9.2 | 8.3 | 8.9 | 8.2 | 7.9 | 8.8 |
| Tensile Strength | | | | | | |
| MD | 8.2 | 7.5 | 7.4 | 7.6 | 7.8 | 8.4 |
| TD | 8.4 | 7.0 | 7.3 | 7.4 | 7.6 | 7.8 |
| Elmendorf Tear | | | | | | |
| MD | 170 | 430 | 520 | 410 | 490 | 410 |
| TD | 270 | 460 | 520 | 620 | 550 | 530 |
| Dart Drop | 158 | 236 | 213 | 301 | 309 | 230 |
| Haze | 1.9 | 43.3 | 23.3 | 11.3 | 39.2 | 12.7 |
| Gloss | 81 | 21 | 27 | 38 | 23 | 42 |

TABLE 1b

| Sample Number | 7 | 8 | 9 | 10 | 11 | 12 |
|---|---|---|---|---|---|---|
| Base Material | 6200 | 6200 | 6200 | 6200 | 6400 | 3576 |
| Modifier | EXACT 4011 | EXACT 4041 | EOD 93-06 | EOD 93-07 | ENGAGE EG8150 | none |
| Wt. % Peroxide | 0.038 | 0.038 | 0.035 | 0.032 | none | none |
| MFR | 9.5 | 8.4 | 10.1 | 9.6 | 4.3 | 9.3 |
| Tensile Strength | | | | | | |
| MD | 7.9 | 7.4 | 7.5 | 7.8 | 7.8 | 9.9 |
| TD | 7.2 | 7.4 | 7.1 | 7.4 | 7.2 | 9.6 |
| Elmendorf Tear | | | | | | |
| MD | 300 | 340 | 410 | 200 | 370 | 190 |
| TD | 610 | 880 | 450 | 510 | 1200 | 430 |
| Dart Drop | 237 | 344 | 189 | 173 | 253 | 140 |
| Haze | 14.9 | 7.0 | 0.7 | 0.5 | 18.2 | 12.2 |
| Gloss (45°) | 37 | 49 | 85 | 85 | 30 | 51 |

While various embodiments of the invention has been shown and described herein, modifications may be made by one skilled in the art without departing from the spirit and the teachings of the invention. The embodiments described herein are exemplary only and are not intended to be limiting. Many variations, combinations, and modifications of the invention disclosed herein are possible and are within the scope of the invention. Accordingly, the scope of protection is not limited by the description set out above, but is defined by the claims which follow, that scope including all equivalents of the subject matter of the claims.

What we claim as our invention is:

1. A polymer blend comprising:
   an ethylene-propylene random copolymer;
   an organic peroxide; and
   a modifier selected from a mettallocene-catalyzed polyethylene-based copolymer, a metallocene-catalyzed polyethylene-based terpolymer and a syndiotactic polypropylene homopolymer, wherein the polymer blend has a melt flow rate of from about 8 dg/min. to about 12 dg/min.

2. The polymer blend of claim 1, wherein the organic peroxide is selected from 2,5-dimethyl-2,5 di-(tert-butylperoxy) hexane and 3,6,9-triethyl-3,6,9-trimethyl-1,2,4,5,7,8-hexonone.

3. The polymer blend of claim 1, wherein the ethylene-propylene copolymer comprises from about 0.4 to about 4 weight percent ethylene.

4. The polymer blend of claim 1, wherein the modifier comprises from about 4 to about 10 weight percent of the blend.

5. The polymer blend of claim 1, wherein the modifier is a metallocene-catalyzed polyethylene-based copolymer.

6. The polymer blend of claim 1, wherein the modifier is a metallocene-catalyzed polyethylene-based terpolymer.

7. The polymer blend of claim 1, wherein the modifier is a syndiotactic polypropylene homopolymer.

8. A method of making a polymer blend comprising:
   providing an ethylene-propylene random copolymer;
   blending an organic peroxide and a modifier selected from the group consisting of a metallocene-catalyzed polyethylene-based copolymer, a metallocene-catalyzed polyethylene-based terpolymer, and a syndiotactic polypropylene homopolymer with the ethylene-propylene random copolymer to form the polymer blend, wherein the blend has a melt flow of from about 8 dg/min. to about 12 dg/min; and forming the polymer blend into a film.

9. The method of claim 8, further comprising visbreaking the polymer blend.

10. The method of claim 9, further comprising forming the polymer blend into a film.

11. An end-use article made from a polymer blend comprising:

an ethylene-propylene random copolymer;

an organic peroxide; and a modifier selected from the group consisting of a metallocene-catalyzed polyethylene-based copolymer, a metallocene-catalyzed polyethylene-based terpolymer, and a syndiotactic polypropylene homopolymer, wherein the polymer blend has a melt flow of from about 8 dg/min. to about 12 dg/min.

12. The end-use article of claim 11 being selected from the group consisting of a film, an injection molded article, a compression molded article, a thermoformed article, and a fiber.

* * * * *